United States Patent
Davis et al.

(10) Patent No.: US 6,202,981 B1
(45) Date of Patent: Mar. 20, 2001

(54) FLUID CONTROL ASSEMBLY WITH FLANGE SPACER

(75) Inventors: Richard L. Davis, Fairport, NY (US); Michael Lim, Marlton, NJ (US)

(73) Assignee: Coltec Industrial Products, Inc., Charlotte, NC (US)

(*) Notice: Subject to any disclaimer, the term of this patent is extended or adjusted under 35 U.S.C. 154(b) by 0 days.

(21) Appl. No.: 09/352,569

(22) Filed: Jul. 13, 1999

Related U.S. Application Data

(60) Provisional application No. 60/106,523, filed on Oct. 31, 1998.

(51) Int. Cl.[7] ................................................ F16K 51/00
(52) U.S. Cl. ............................ 251/143; 251/148; 251/151; 285/93
(58) Field of Search .................................. 251/148, 150, 251/151, 143, 305; 285/93, 405

(56) References Cited

U.S. PATENT DOCUMENTS

| | | |
|---|---|---|
| 2,740,423 | 4/1956 | Stillwagon . |
| 2,994,342 | 8/1961 | Stillwagon . |
| 3,367,624 * | 2/1968 | Scaramucci .......................... 251/148 |
| 3,409,268 * | 11/1968 | Gachot ................................ 251/148 |
| 3,659,822 * | 5/1972 | Nagy ............................... 251/148 X |
| 3,910,552 * | 10/1975 | Hills et al. ........................... 251/148 |
| 4,079,746 | 3/1978 | Killian . |
| 4,101,112 * | 7/1978 | Conners et al. ...................... 251/148 |
| 4,121,859 * | 10/1978 | DeMey, II .............................. 285/93 |

(List continued on next page.)

FOREIGN PATENT DOCUMENTS

| | | |
|---|---|---|
| 0 292 659 | 11/1998 | (EP) . |
| 2 580 762 | 10/1986 | (FR) . |
| 233488 | 5/1925 | (GB) . |

OTHER PUBLICATIONS

International Search Report, Dec. 12, 1999.

*Primary Examiner*—Joseph A. Kaufman
*Assistant Examiner*—John Bastianelli
(74) *Attorney, Agent, or Firm*—Cummings & Lockwood

(57) ABSTRACT

A fluid control assembly including a fluid control device having a main body, annular shoulders extending from opposite sides of the main body, and a tubular, relatively compressible liner extending out of opposite sides of the body through and axially beyond the shoulders, and at least one relatively non-compressible flange spacer positioned on each shoulder. The flange spacers extend from the main body of the fluid control device to between ends of the shoulders and ends of the liner, when the liner is in a non-compressed state. According to one embodiment, the fluid control assembly further includes bolts for securing the fluid control assembly to a pipe flange, and a liveload assembly positioned on each bolt. Each liveload assembly includes an upper washer, a lower washer, at least one spring positioned to resist compression between the upper and the lower washers, and a ribbon secured at a first end to one of the upper and the lower washers, with a second end of the ribbon extending towards the other of the upper and the lower washers. The ribbon has a total length including a comparison portion substantially equal to a proper compressed height of the at least one spring, with only the comparison portion of the total length positioned between the upper and the lower washers for comparison with the height of the spring.

32 Claims, 5 Drawing Sheets

U.S. PATENT DOCUMENTS

| | | | |
|---|---|---|---|
| 4,221,307 | * | 9/1980 | Peterson ............................ 251/328 X |
| 4,288,105 | * | 9/1981 | Press ................................... 285/93 X |
| 4,399,833 | * | 8/1983 | Holtgraver ....................... 251/305 X |
| 4,505,289 | * | 3/1985 | Wilson ............................. 251/148 X |
| 4,527,771 | * | 7/1985 | Yeary ............................... 251/305 X |
| 4,552,386 | | 11/1985 | Burchette . |
| 4,691,740 | | 9/1987 | Svetlik et al. . |
| 4,751,938 | * | 6/1988 | Kerns et al. ..................... 251/148 X |
| 4,832,079 | * | 5/1989 | Nielson ............................ 251/148 X |
| 4,919,391 | * | 4/1990 | Kemp .................................... 251/148 |
| 5,029,811 | * | 7/1991 | Yamamoto et al. ............. 251/306 X |
| 5,171,041 | | 12/1992 | McMillan et al. . |
| 5,174,615 | | 12/1992 | Foster et al. . |
| 5,361,801 | * | 11/1994 | Kerpan et al. ................... 251/148 X |
| 5,362,115 | | 11/1994 | Carr . |
| 5,660,417 | * | 8/1997 | Reeves ................................... 285/93 |
| 5,685,520 | * | 11/1997 | Velan ............................... 251/305 X |

\* cited by examiner

FLUID CONTROL ASSEMBLY WITH FLANGE SPACER

RELATED APPLICATIONS

This application claims priority to U.S. provisional patent application Ser. No. 60/106,523 filed on Oct. 31, 1998, the disclosure of which is herein incorporated by reference in its entirety.

BACKGROUND

The present disclosure relates to joined pipe flanges and, more particularly, a fluid control device secured between pipe flanges. Even more particularly, the present disclosure relates to a fluid control assembly adapted to be secured between two pipe flanges and including flange spacers.

Pipes and fluid control devices, such as valves and pumps, are common in the utility, refinery, manufacturing, chemical and petrochemical industries for transporting fluids. Pipes often include attachment flanges at their ends, and fluid control devices are secured between the pipe flanges, usually using bolts. In such cases it is desirable that stresses be applied to the pipe flanges evenly, that the fluid control device is properly aligned with the pipes, and that the bolts are correctly torqued or loaded.

For example, fiberglass reinforced pipe ("FRP") as well as other plastic piping systems and components provide many industries with a corrosion-resistant, less costly replacement for metal piping. However, since plastic piping is, by its nature, not as strong as metal piping, flanges of plastic piping may be more susceptible to cracking upon uneven loading or rotation of the flanges.

Improper alignment of the fluid control device with the pipes could interfere with operation of the fluid control device. Butterfly valves, for example, typically include a generally cylindrical body which is connected into a pipe line by being clamped between two pipe flanges. The valve body has a flowway therethrough and a valve element is mounted in the flowway for movement from a closed valve position to an open valve position. In the open valve position, the valve element can extend out of, and beyond the valve body. Thus, correctly aligning the valve with the pipes is necessary to prevent interference between the valve element and the pipe flanges during movement of the valve element between the closed and open positions.

In addition, bolt creep and improper loading or torquing of bolts joining the pipe flanges to the fluid control device can result in a loosening or weakening of the joint. Bolt creep is a condition wherein bolts naturally loosen over time due to machine vibration and thermal expansions and contractions, for example. Improper loading can occur due to inaccurate torquing of bolts holding flanges together.

Thus, what is desired is a fluid control assembly for clamping between pipe flanges that provides reduced flange stresses and easy alignment with the pipes. What is also desired is a fluid control assembly wherein bolt creep is reduced or eliminated, and wherein bolt loading is made easy and convenient, both in the assembly of the joint and in the maintenance of the joint.

SUMMARY OF DISCLOSURE

Accordingly, the present disclosure provides a fluid control assembly including a fluid control device and a relatively non-compressible flange spacer. The fluid control device has a main body, an annular shoulder extending from the main body, and a tubular, relatively compressible liner extending out of the body through and axially beyond the shoulder. The relatively non-compressible flange spacer is positioned on the shoulder and extends from the main body to between an end of the shoulder and an end of the liner, when the liner is in a non-compressed state. Whereby, the flange spacer prevents a pipe flange secured to the fluid control device from bending, or "rotating", when clamped to the device, thereby substantially eliminating uneven stresses on the pipe flange. The flange spacer also allows the liner to be compressed, but not over-compressed and damaged, such that the compressed liner provides a fluid-tight seal between the fluid control device and the pipe flange, yet does not interfere with movement of a valve member within the liner.

According to one aspect, the flange spacer comprises a perimeter spacer ring having an inner diameter equal to an outer diameter of the annular shoulder. According to another aspect, the fluid control assembly is for connection to a pipe flange and the perimeter spacer ring has an outer diameter equal to an outer diameter of the pipe flange, such that the ring allows the fluid control device to be easily and properly aligned with the pipe flange.

According to an additional aspect, the main body of the fluid control device includes bolt holes passing therethrough and the perimeter spacer ring has bolt openings corresponding to the bolt holes of the fluid control device. According to a further aspect, the fluid control assembly further includes bolts for securing the fluid control assembly to a pipe flange, and a liveload assembly positioned on each bolt for preventing bolt creep and maintaining clamping pressure on the flanges. Each liveload assembly includes an upper washer, a lower washer, and at least one spring positioned to resist compression between the upper and the lower washers.

According to still another aspect, the liveload assemblies also include a ribbon secured at a first end to one of the upper and the lower washers, with a second end of the ribbon extending towards the other of the upper and the lower washers. The ribbon has a total length, including a comparison portion substantially equal to a proper compressed height of the at least one spring, with only the comparison portion of the total length positioned between the upper and the lower washers for comparison with the height of the spring.

BRIEF DESCRIPTION OF THE DRAWINGS

So that those having ordinary skill in the art to which this disclosure pertains will more readily understand how to construct a fluid control assembly in accordance with this disclosure, preferred embodiments of the fluid control assemblies will be described in detail hereinbelow with reference to the drawings wherein.

DETAILED DESCRIPTION

Figure 1:
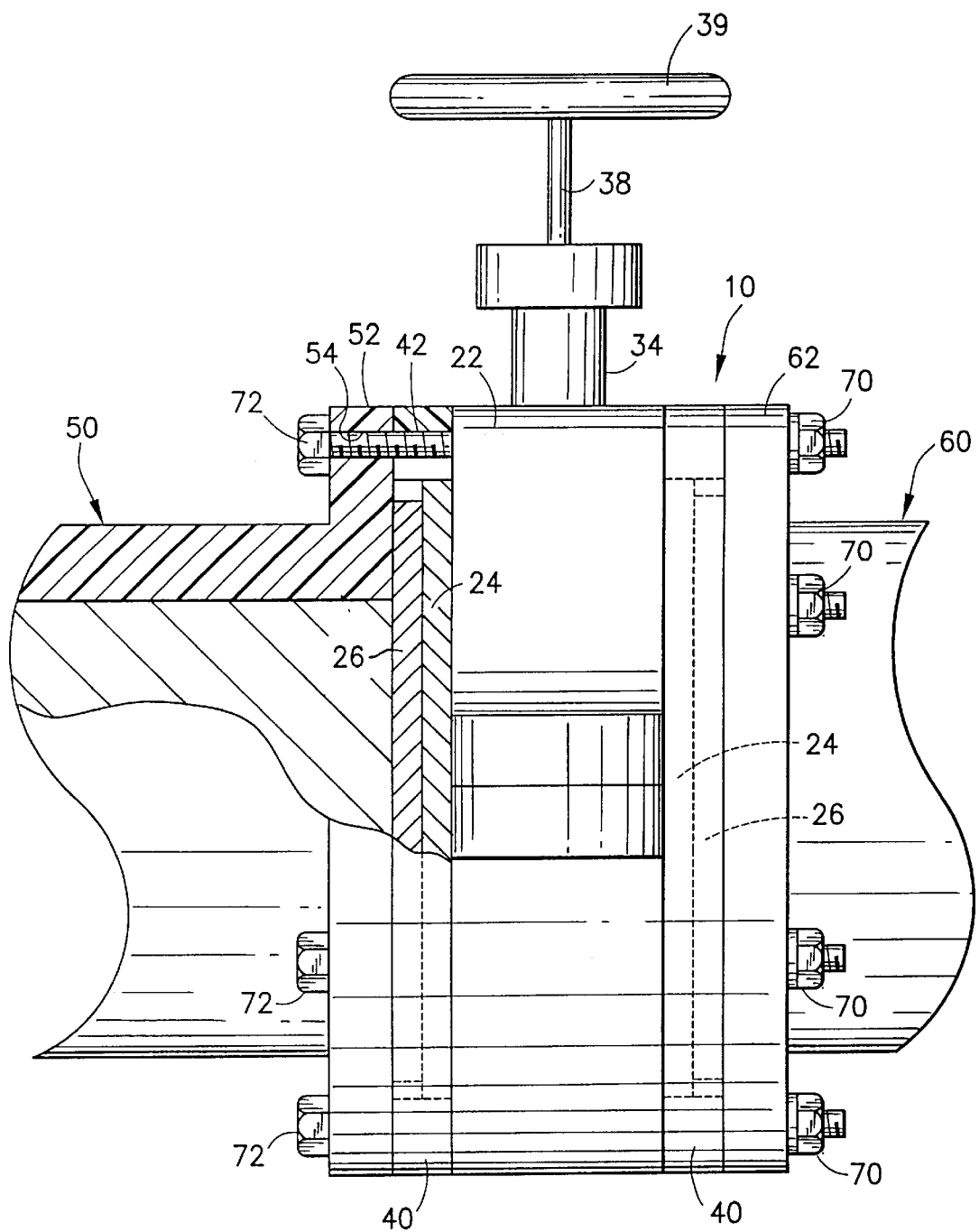
FIG. 1 shows a side elevation view, partially in section, of a fluid control assembly according to the present disclosure, secured between two pipe flanges.
Figure 2:
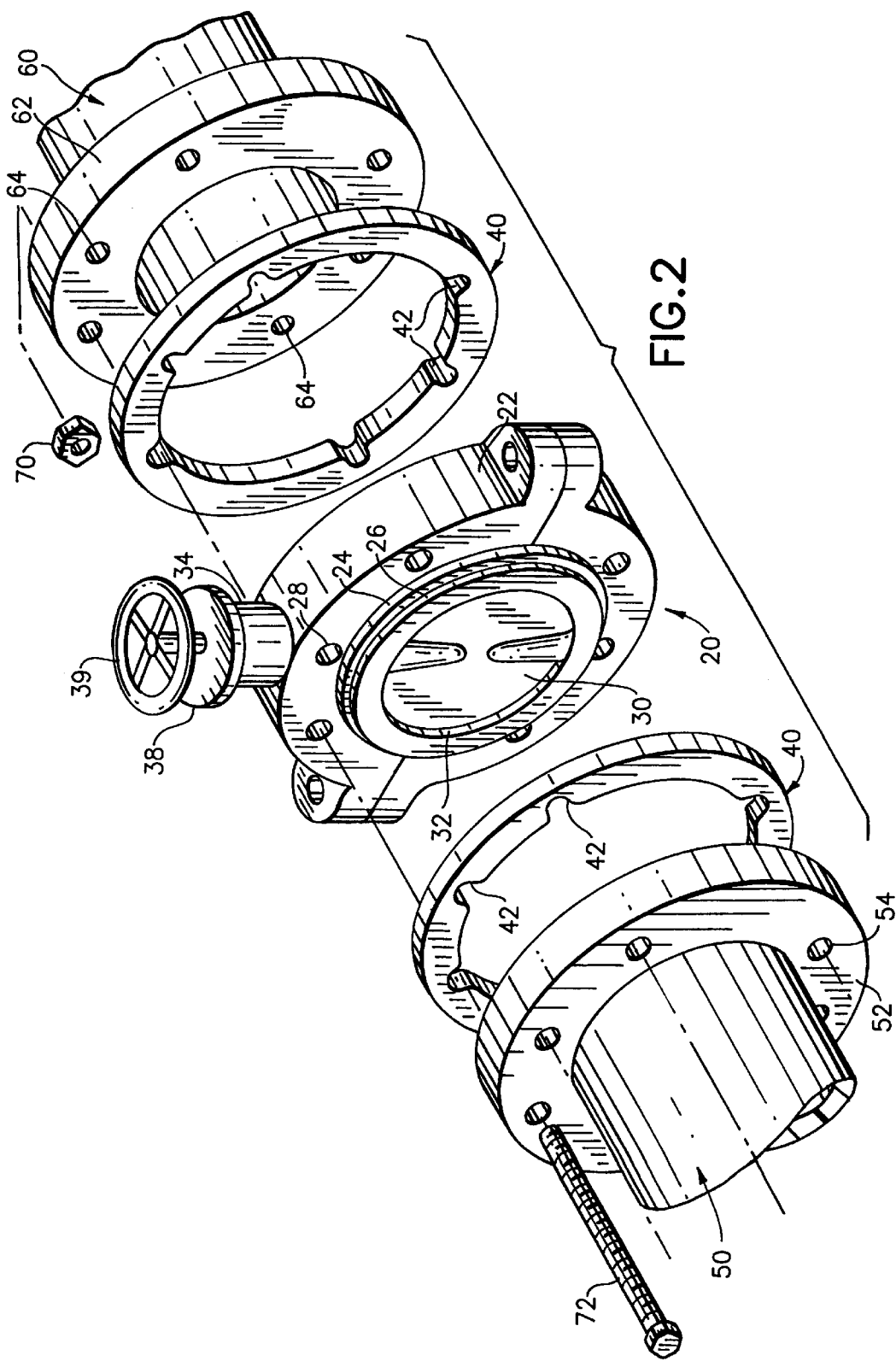
FIG. 2 shows an exploded isometric view of the fluid flow assembly and pipe flanges of FIG. 1.
Figure 3:
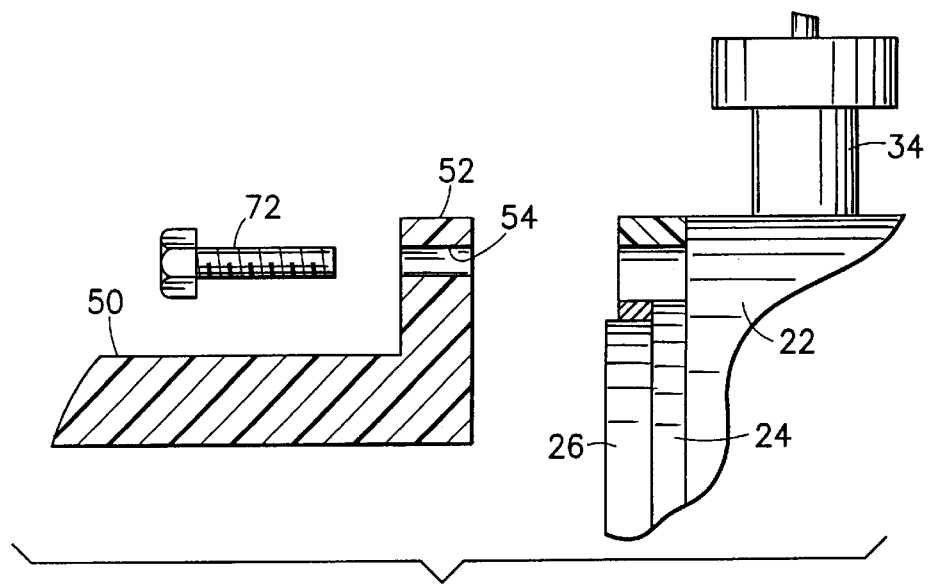
FIG. 3 shows a side elevation view, partially in section, of portions of one of the pipe flanges and the fluid control assembly of FIG. 1.

Referring to FIGS. 1 through 3, a fluid control assembly 10 disclosed herein includes a fluid control device 20 having a main body 22 defining a fluid passageway and annular shoulders 24 extending from opposite sides of the main body in alignment with the passageway. The device 20 also includes a tubular, relatively compressible liner 26 positioned in the passageway and extending out of opposite sides of the body 22, through and just axially beyond the annular shoulders 24. The assembly 10 further has relatively non-compressible flange spacers 40 positioned on the shoulders 24 of the fluid control device 20.

Figure 4:
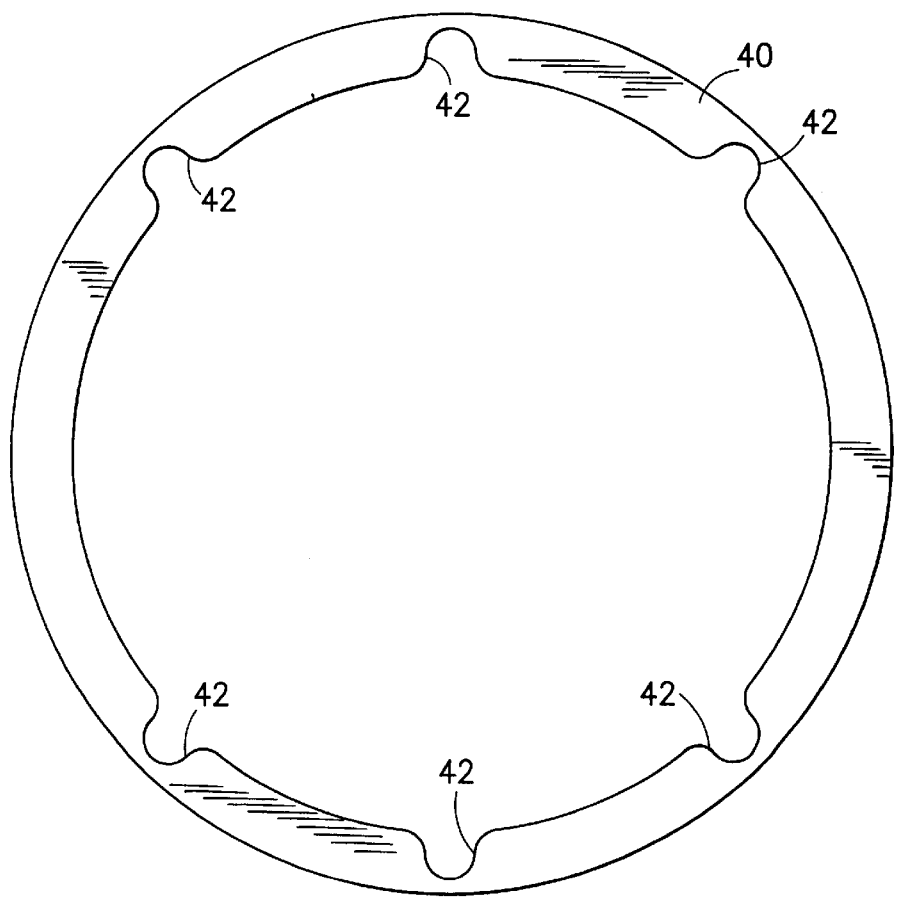
FIG. 4 shows a front elevation view of a flange spacer of the fluid control assembly of FIG. 1.
Figure 4A:
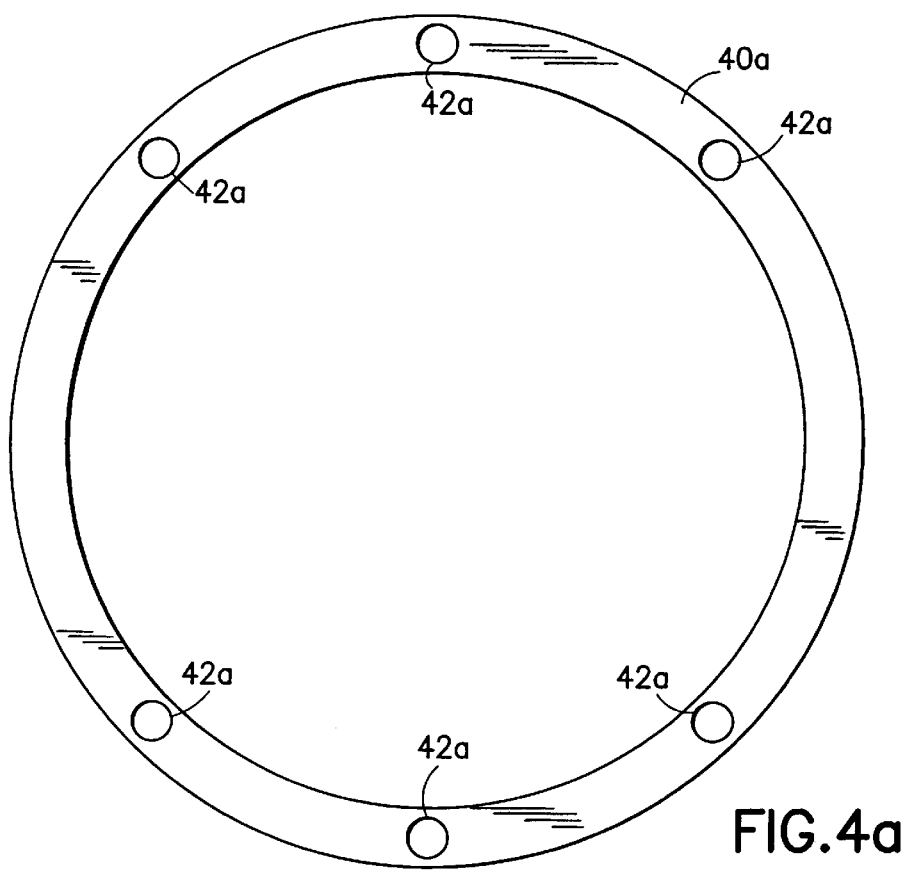
FIG. 4a shows a front elevation view of another flange spacer of the fluid control assembly of FIG. 1.

In the particular embodiment shown, the fluid control device comprises a butterfly valve 30 for being secured between flanges 52, 62 of two pipes 50, 60 with a plurality of fasteners. The fasteners can comprise nuts 72 and bolts 70. The bolts 70 extend through bolt holes 54, 64 in the flanges 52, 62 and bolt holes 28 in the main body 22 of the valve 20 and are fastened with the nuts 72 to clamp the valve between the pipe flanges in a fluid-tight manner. Referring also to FIG. 4, when the fasteners are provided in the form of nuts 72 and bolts 70, the flange spacers 40 each include a plurality of openings 42 corresponding to the bolt holes 54, 64 in the flanges 52, 62 and bolt holes 28 in the valve 20, for allowing the bolts 70 to pass therethrough.

The relatively compressible liner 26 is preferably comprised of PTFE, while each flange spacer 40 is made of a rigid, relatively non-compressible and non-corrosive material, for instance a metal, such as stainless steel or aluminum, or a plastic, such as PVC or polypropelene. By relatively compressible and relatively non-compressible, it is meant that the flange spacers 40 are relatively non-compressible with respect to the liner 26. Each flange spacer 40 has a pre-determined thickness such that the flange spacers extend further from the main body 22 of the valve 20 than the shoulders 24, but less than the liner 26 when the liner is not compressed, as best shown in FIG. 3. Thus, when the valve 20 is secured between the pipes flanges 52, 62, the flange spacers 40 prevent the flanges from bending towards each other, or "rotating", when the bolts 70 are tightened, thereby substantially eliminating uneven stresses on the pipe flanges. However, the flange spacers 40 allow the liner 26 to be compressed, but not over-compressed, such that the compressed liner provides a fluid-tight seal between the valve 20 and the pipes 50, 60, yet does not interfere with movement of a valve element 30 within a fluid passageway 32 of the valve 20.

Unless otherwise noted, terms such as "radial," "longitudinal," "axial," etc. will be used herein with reference to the centerline of the fluid passageway 32 of the valve 20. The disc-like valve element 30, which is preferably coated with PTFE, is rotatably mounted in the fluid passageway 32 for rotation about an axis which extends diametrically across the fluid passageway 32, specifically through the centerline of the boss 34 of the valve body 22. A valve stem 38 is attached to valve element 30, extends through a boss 34, and can be engaged by suitable actuator means or by a hand operated handle 39 or the like to rotate the valve element between a closed valve position, in which it extends transversely across the fluid passageway 32, and an open valve position, in which it extends generally along the fluid passageway axis. In the latter position, the valve element 30 extends axially out of the main body 22. Thus, the fluid passageway 32 must be in substantial register with the pipes 50, 60 to prevent the valve element 30 from jamming against the flanges 52, 62 when moved from its closed valve position to its open valve position.

The flange spacers 40 can be provided in the form of a perimeter spacer rings, as shown best in FIG. 4. Preferably, the perimeter spacer rings have an inner diameter equal to outer diameters of the shoulders 24 and an outer diameter equal to outer diameters of the pipe flanges 52, 62, such that the rings allow the valve 20 to be easily and properly aligned with the pipe flanges. The perimeter spacer rings also allow the valve 20 to be properly aligned with the pipe flanges 52, 62 such that the valve element 30 within the fluid passageway 32 of the valve 20 does not contact either of the pipes 50, 60 and become damaged when opened and closed. As shown, the bolt openings of the perimeter spacer rings 40 are provided in the form of notches 42.

Figure 4B:
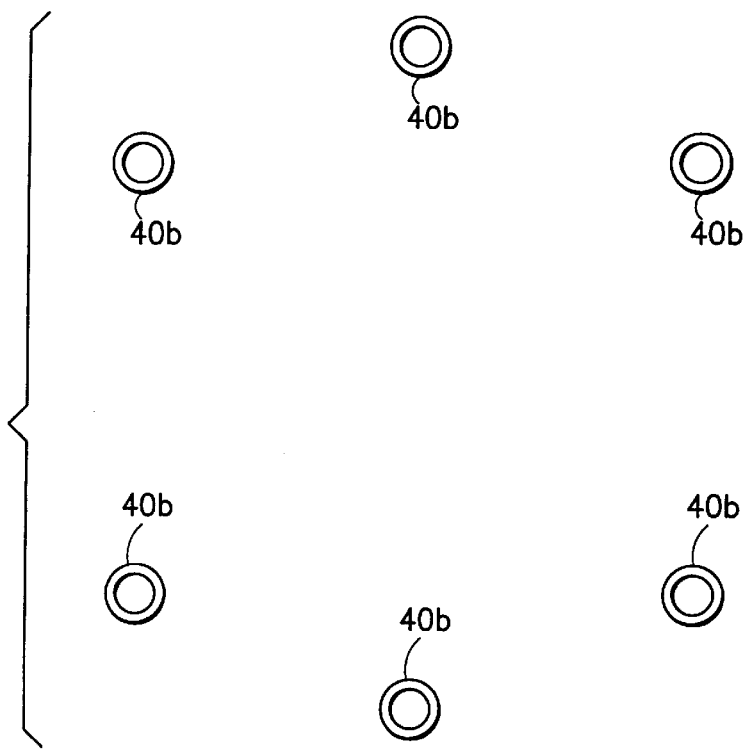
FIG. 4b shows a front elevation view of additional flange spacers of the fluid control assembly of FIG. 1.

It should be understood that the flange spacers 40 can be provided in many forms. For example, the flange spacers can be provided in the form of perimeter spacer rings 40a, similar to the perimeter spacer rings of FIG. 4, but wherein the bolt openings of the perimeter spacer rings 40a are provided in the form of holes 42a, as shown best in FIG. 4. The flange spacers 40 can additionally be provided in the form of a multiplicity of washers 40b placed in a pattern along the shoulder diameter, as shown in FIG. 4b.

Figure 5:
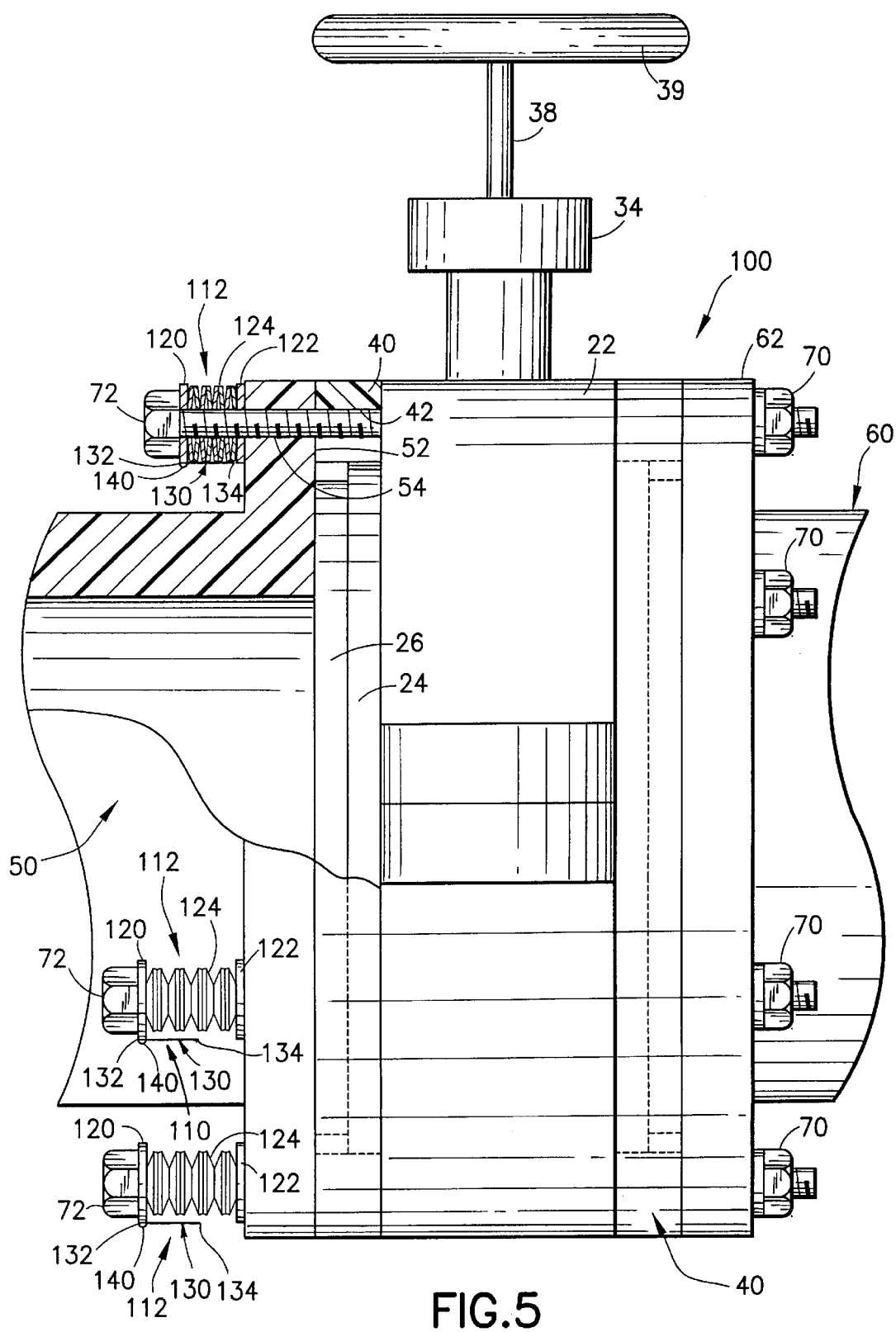
FIG. 5 shows a side elevation view, partially in section, of another fluid control assembly according to the present disclosure, secured between two pipe flanges.

Referring to FIG. 5, another fluid control assembly 100 according to the present disclosure is shown. The assembly 100 of FIG. 5 is similar to the assembly 10 of FIGS. 1 through 3, but each bolt 72 is provided with a liveload assembly 112 for maintaining proper compression on the flanges 52, 52 during the life of the assembly 100.

Each liveload assembly 112 includes an outer washer 120, an inner washer 122, and at least one spring 124 positioned to resist compression between the outer and the inner washers. Each liveload assembly 112 also includes a compression indicator 110 that provides a visual indication of a proper compressed height, or deflection, of the assembly 112. The indicator includes a ribbon 130 and a ribbon fastener 140. The ribbon fastener 140 secures a first end 132 of the ribbon 130 to the outer washer 120, and a second end 134 of the ribbon 130 extends towards the inner washer 122. The ribbon 130 has an overall length including a comparison portion L between the outer and the inner washers 120, 122 equal to a proper compressed height of the spring 124.

Preferably, the ribbon fastener is provided in the form of a screw 140 that extends through a hole in the first end 132 of the ribbon 130 and is threadingly received in a threaded bore in a side surface of the outer washer 120. Alternatively, however, the ribbon fastener could simply comprise a spot-weld or adhesive, for example, or another suitable type of fastener between the ribbon 130 and the outer washer 120.

The ribbon 130 is preferably elongated and rigid, and made of metal or plastic, for example. In addition, the ribbon 130 is preferably provided in a bright color, such as fluorescent orange for example, to enhance seeing the ribbon and comparing the ribbon to the spring 124. Furthermore, the ribbon 130 preferably has English or metric length measurement markings such that its actual length can be easily determined.

The outer and the inner washers 120, 122 of the assembly 112 are preferably flat washers, while the at least one spring is preferably a plurality of cupped disc spring washers 124. It should be appreciated, however, that the at least one spring could comprise a helical coil or other suitably resilient article for resisting compression. In addition, the outer and the inner washers and the at least one spring can all be provided as cupped disc spring washers.

Cupped disc spring washers 124 are commonly referred to as "Belleville washers." The Belleville washers 124 are conical rings which flatten when compressed under force. Manufacturers of Belleville washers provide specifications showing the dimensions of the washers and the load carried by the washer under compression at specified percent deflection. The specifications are used to select Belleville washers for maintaining torque for a particular installation, as discussed below. Preferably, Belleville washers 124 with linear regressive load deflections are incorporated, since such washers provide a direct correlation between the compression and deflection. Other types of Belleville washers will work with the compression indicator 110 disclosed, but to equate deflection to compression requires reference to other formulas or the manufacturer's spring table specifications.

A representative method for liveloading the flanges includes first calculating the length L of the ribbon 130 between the outer and the inner washers 120, 122. This length L is based upon the number and type of Belleville washers 124 selected for the particular application. Specifically, the length L is equal to the total height of the stack of Belleville washers 124 at between 25% and 75% deflection. Most preferably, the length L of the ribbon 130 between the outer and the inner washers 120, 122 is equal to the total height of the stack of Belleville washers 124 at about 75% deflection, since deflections approaching about 101% over-stress the washers, while deflections below about 25% do not provide sufficient force to ensure a fluid tight seal.

Thus, the comparison portion L of the total length of the ribbon 130 is calculated using the number of Belleville washers 124, the height of each washer in an uncompressed state, and the reduction in height of each washer at 75% deflection. For example, the comparison portion L of the ribbon 130 between the outer and the inner washers 120, 122, or the proper compressed height of the Belleville washers 124, is computed as follows:

$$L=n(H-h)$$

Wherein, L is the comparison portion of the ribbon 130 between the outer and the inner washers 120, 122, n is the total number of Belleville washers 124, H is the height of one Belleville washer 124 prior to compression, and h is the reduction in height of the Belleville washer 124 when compressed to about 75% deflection.

Once the comparison portion L of the length of the ribbon 130 is determined, the ribbon can be cut to size and secured to the outer washer 120 of the liveload assembly. In the embodiment shown, the total length of the ribbon 130 includes the comparison portion L plus an additional portion for securing the first end 132 of the ribbon to the outer washer 120. Then each of the liveload assemblies 112 are positioned on one of the bolts 72 and the bolt is tightened until the second end 134 of the ribbon 130 is equal with the inner washer 122, and, more preferably, until the second end of the ribbon is contiguous with an outwardly facing surface of the inner washer 122.

Any future loosening of the bolts 72 causes the deflection, or compression, of the Belleville washers 124 to decrease such that the outer washer 120 and the attached ribbon 130 move axially away from the inner washer 122 of each liveload assembly 112. The position of the second end 134 of the ribbon 130 with respect to the inner washer 122 permits visual monitoring of the load provided by the liveload assembly 112. Thus, when the second end 134 of the ribbon 130 moves away from the inner washer 122, the bolts 72 should be further tightened to recompress the Belleville washers 124 until the second end 134 of the ribbon 130 is once again even with the outwardly facing surface of the inner washer 122, so that the Belleville washers are properly compressed.

The principles, preferred embodiments and modes of operation of the presently disclosed fluid control assemblies have been described in the foregoing specification. The disclosed fluid control assemblies, however, are not to be construed as limited to the particular embodiments shown, as these embodiments are regarded as illustrious rather than restrictive. Moreover, variations and changes may be made by those skilled in the art without departing from the spirit of the presently disclosed fluid control assemblies.

What is claimed is:

1. A fluid control assembly comprising:
a valve body having a front surface and a back surface, a flow way extending through said valve body from said front surface to said back surface, a valve element mounted in said flow way for movement from a first position closing said flow way and a second position opening said flow way, at least one shoulder extending about said flow way from said front and/or back surface of said valve body, and a relatively compressible liner lining said flow way and said shoulder(s) and extending beyond said shoulder(s);
and at least one relatively non-compressible flange spacer positioned about said shoulder(s), said spacer(s) extending from said front surface and/or back surface of said valve body to a position inferior to the end of said liner extending beyond said shoulders.

2. A fluid control assembly of claim 1 wherein said flange spacer comprises a perimeter spacer ring having an inner dimension substantially equal to an outer dimension of said shoulder.

3. A fluid control assembly of claim 2 positioned between a set of pipe flanges wherein said flange spacer further has an outer dimension substantially equal to an outer dimension if said pipe flanges.

4. A fluid control assembly of claim 1 wherein said valve body further has one or more holes passing through said front and said back surfaces.

5. A fluid control assembly of claim 4 wherein said flange spacer(s) have one or more holes or notches passing there through, such holes or notches being correspondingly positioned with respect to said one or more holes of said valve body of claim 4.

6. A fluid control assembly of claim 1 wherein said valve body further has one or more notches.

7. A fluid control assembly of claim 6 wherein said flange spacer(s) have one or more holes or notches passing there through, such holes or notches being correspondingly positioned with respect to said one or more notches of said valve body of claim 6.

8. A fluid control assembly of claim 1 wherein the flange spacer(s) comprise a plurality of washers.

9. A fluid control assembly of claim 8 wherein said washers define one or more holes or notches.

10. A fluid control assembly of claim 9 wherein said valve body further has one or more holes passing through said front and said back surfaces.

11. A fluid control assembly of claim 10 wherein said holes or notches of said washer(s) are correspondingly sized with respect to said one or more holes of said valve body.

12. A fluid control assembly of claim 9 wherein said valve body further has one or more notches passing through said front and said back surfaces.

13. A fluid control assembly of claim 12 wherein said holes or notches of said washer(s) are correspondingly sized with respect to said one or more holes of said valve body.

14. The fluid control assembly of claim 3 wherein the fluid control assembly is attached to said pipe flanges by a plurality of bolts.

15. The fluid control assembly of claim 14 further comprising a liveload assembly positioned about one or more of said bolts, each liveload assembly comprising: an upper liveload washer, a lower liveload washer, and at least one spring positioned to separate said upper washer from said lower liveload washer and a compression indicator having a comparison portion between said upper and said lower liveload washers substantially equal to a proper compressed height of said at least one spring, said compression indicator being secured to either of said upper or lower liveload washer.

16. The fluid control assembly of claim 1 wherein the valve element is a butterfly valve.

17. A fluid control assembly comprising:
a valve body having a front surface and a back surface, a flow way extending through said valve body from said front surface to said back surface, a valve element mounted in said flow way for movement from a first position closing said flow way and a second position opening said flow way, at least one annular shoulder extending about said flow way from said front and/or back surface of said valve body, and a relatively compressible liner lining said flow way and said shoulder(s), and extending beyond said shoulder(s), said relatively compressible liner sized so as to permit movement of said valve member within said liner and to provide a liquid-tight seal between said valve member and said liner when said value member is closed;
and at least one relatively non-compressible flange spacer positioned about said shoulder(s), said spacer(s) extending from said front surface and/or back surface of said valve body to a position inferior to the end of said liner extending beyond said shoulders.

18. A fluid control assembly of claim 17 wherein said flange spacer comprises a perimeter spacer ring having an inner dimension substantially equal to an outer dimension of said shoulder.

19. A fluid control assembly of claim 18 positioned between a set of pipe flanges wherein said flange spacer further has an outer dimension substantially equal to an outer dimension if said pipe flanges.

20. A fluid control assembly of claim 17 wherein said valve body further has one or more holes passing through said front and said back surfaces.

21. A fluid control assembly of claim 20 wherein said flange spacer(s) have one or more holes or notches passing there through, such holes or notches being correspondingly positioned with respect to said one or more holes of said valve body of claim 4.

22. A fluid control assembly of claim 17 wherein said valve body further has one or more notches.

23. A fluid control assembly of claim 22 wherein said flange spacer(s) have one or more holes or notches passing there through, such holes or notches being correspondingly positioned with respect to said one or more notches of said valve body of claim 22.

24. A fluid control assembly of claim 17 wherein the flange spacer(s) comprise a plurality of washers.

25. A fluid control assembly of claim 24 wherein said washers define one or more holes or notches.

26. A fluid control assembly of claim 25 wherein said valve body further has one or more holes passing through said front and said back surfaces.

27. A fluid control assembly of claim 26 wherein said holes or notches of said washer(s) are correspondingly sized with respect to said one or more holes of said valve body.

28. A fluid control assembly of claim 25 wherein said valve body further has one or more notches passing through said front and said back surfaces.

29. A fluid control assembly of claim 28 wherein said holes or notches of said washer(s) are correspondingly sized with respect to said one or more holes of said valve body.

30. The fluid control assembly of claim 19 wherein the fluid control assembly is attached to said pipe flanges by a plurality of bolts.

31. The fluid control assembly of claim 30 further comprising a liveload assembly positioned about one or more of said bolts, each liveload assembly comprising: an upper liveload washer, a lower liveload washer, and at least one spring positioned to separate said upper washer from said lower liveload washer and a compression indicator having a comparison portion between said upper and said lower liveload washers substantially equal to a proper compressed height of said at least one spring, said compression indicator being secured to either of said upper or lower liveload washer.

32. The fluid control assembly of claim 17 wherein the valve element is a butterfly valve.

* * * * *